US007969211B2

United States Patent
Huang

(10) Patent No.: US 7,969,211 B2
(45) Date of Patent: Jun. 28, 2011

(54) POWER DETECTING DEVICE, POWER SUPPLY DEVICE USING THE SAME AND REFERENCE VOLTAGE GENERATOR

(75) Inventor: Da-Rong Huang, Tainan County (TW)

(73) Assignee: Himax Technologies Limited, Tainan (TW)

( * ) Notice: Subject to any disclaimer, the term of this patent is extended or adjusted under 35 U.S.C. 154(b) by 158 days.

(21) Appl. No.: 12/421,827

(22) Filed: Apr. 10, 2009

(65) Prior Publication Data

US 2010/0259304 A1 Oct. 14, 2010

(51) Int. Cl.
*H03L 7/00* (2006.01)
(52) U.S. Cl. .......................................... 327/143
(58) Field of Classification Search ............. 327/142
See application file for complete search history.

(56) References Cited

U.S. PATENT DOCUMENTS

| | | | |
|---|---|---|---|
| 7,589,572 B2* | 9/2009 | Frulio et al. | 327/143 |
| 2009/0002037 A1* | 1/2009 | Ryoo | 327/143 |

* cited by examiner

*Primary Examiner* — Lincoln Donovan
*Assistant Examiner* — Daniel Rojas
(74) *Attorney, Agent, or Firm* — J.C. Patents

(57) ABSTRACT

A power detecting device, a power supply device using the same, and a reference voltage generator are provided. The power detecting device adapted to detect a power voltage of a display device includes a bandgap voltage generating circuit, a voltage regulating circuit, and a power-on reset circuit. The bandgap voltage generating circuit provides a reference voltage via an output terminal thereof. The voltage regulating circuit and the power-on reset circuit are coupled to the output terminal of the bandgap voltage generating circuit. When the power voltage doesn't reach a threshold voltage, the voltage regulating circuit increases the reference voltage referred by the power-on reset circuit. When the power voltage reaches the reference voltage, the power-on reset circuit generates a reset signal to reset the display device. Therefore, when the power voltage doesn't reach a stable, the power-on reset circuit will not be incorrectly started by increasing the reference voltage.

17 Claims, 2 Drawing Sheets

POWER DETECTING DEVICE, POWER SUPPLY DEVICE USING THE SAME AND REFERENCE VOLTAGE GENERATOR

BACKGROUND OF THE INVENTION

1. Field of Invention

The present invention relates to a power detecting device, a power supply device and a reference voltage generator, and more particular, to a device that controls power-on resetting by detecting a power voltage.

2. Description of the Related Art

Recently, due to the numerous advantages of the LCD, such as low power consumption, free of radiation, and high space utilization, the LCD has become the main stream in the market. In the power supply system of the LCD, a power-on reset circuit is usually utilized for providing a reset signal to reset the LCD when power is started, and ensuring the LCD operates under a known state.

The power-on reset circuit is usually implemented by using a resistor-capacitor (RC) circuit and a Schmitt trigger circuit. As the increase of the power, the RC circuit generates a charging signal to the Schmitt trigger circuit. The Schmitt trigger circuit generates a rising edge of the reset signal when the charging signal reaches a first threshold value, and then generates a falling edge of the reset signal when the charging signal reaches a second threshold value to reset the device. A time that the charging signal changes from the first threshold value to the second threshold (i.e. a pulse width of the reset signal) should be long enough to complete the reset operation of the internal circuits of the device.

However, the charging signal is a ramp signal, which a rising rate of the charging signal is determined according to the resistance and the capacitance of RC circuit. If the power increases rapidly, the resistance and the capacitance of RC circuit should be increased for obtaining the reset signal which its pulse width is long enough. Nevertheless, if the power increases slowly, the charging signal may not drive the Schmitt trigger circuit to operate, so that the reset signal can not be generated.

In another aspect, the power-on reset circuit can use a comparator to compare a divided voltage, obtained from dividing the power through series-connected resistors, with a reference voltage generated by a bandgap voltage generating circuit, and thereby generates the reset signal to reset the device. That is to say the comparator generates the reset signal to reset the device when the divided voltage reaches the reference voltage. However, the operation of the bandgap voltage generating circuit is also driven by the power. In the beginning of the power on the rise, or when the power is transiently supplied to an over load, the bandgap voltage generating circuit is likely affected by the unstable power to generate a smaller reference voltage, and thus the power-on reset circuit may be started incorrectly.

When the LCD is reset, pixel capacitors on a display panel are usually discharged for displaying a black frame. The incorrect operation of the power-on reset circuit causes residual voltages stored within the pixel capacitor since there's not enough time for the pixel capacitors to discharge. As a result, deficient image may occur on the displayed frame. The designers should make efforts on the improvement of detecting the power.

SUMMARY OF THE INVENTION

According, the present invention provides a power detecting device and a power supply device using the same that control the operation of a power-on reset circuit by detecting a power voltage provided to a display device for avoiding the power-on reset circuit to start incorrectly.

The present invention provides a power detecting device for detecting a power voltage provided to a display device. The power detecting device includes a bandgap voltage generating circuit, a voltage regulating circuit and a power-on reset circuit. The bandgap voltage generating circuit, driven by the power voltage to operate, provides a reference voltage to the power-on reset circuit via an output terminal thereof. The voltage regulating circuit and the power-on reset circuit are coupled to the output terminal of the bandgap voltage generating circuit. When the power voltage does not reach a threshold voltage, the voltage regulating circuit increases the reference voltage to be higher than the power voltage. When the power voltage reaches the reference voltage, the power-on reset circuit generates a reset signal to reset the display device.

The present invention provides a power supply device for a display device. The power supply device includes a power generating circuit, a bandgap voltage generating circuit, a voltage regulating circuit and a power-on reset circuit. The power generating circuit provides a power voltage to the display device when the power generating circuit is started. The bandgap voltage generating circuit, driven by the power voltage to operate, provides a reference voltage to the power-on reset circuit via an output terminal thereof. The voltage regulating circuit and the power-on reset circuit are coupled to the output terminal of the bandgap voltage generating circuit. When the power voltage does not reach a threshold voltage, the voltage regulating circuit increases the reference voltage to be higher than the power voltage. When the power voltage reaches the reference voltage, the power-on reset circuit generates a reset signal to reset the display device.

The present invention provides a reference voltage generator including a bandgap voltage generating circuit and a voltage regulating circuit. The bandgap voltage generating circuit, driven by a power voltage to operate, provides a reference voltage via an output terminal thereof. The voltage regulating circuit is coupled to the output terminal of the bandgap voltage generating circuit. When the power voltage does not reach a threshold voltage, the voltage regulating circuit increases the reference voltage to be higher than the power voltage.

In an embodiment of the foregoing power detecting device and the power supply device, the voltage regulating circuit includes a comparing unit and a switching unit. The comparing unit generates a control voltage according to a comparison result between the power voltage and the threshold. A first terminal and a second terminal of the switching unit are respectively coupled to the power voltage and the power-on reset circuit. The switching unit is determined to conduct the first terminal to the second terminal under the control of the control voltage for increasing the reference voltage.

The present invention provides the power detecting device and the power supply device that utilizes the voltage regulating circuit to adjust the reference voltage for avoiding the power-on reset circuit being started when the power voltage is unstable and decreasing the occurrence probability of deficient image. The bandgap voltage generating circuit is driven to operate by the power voltage. When the power voltage is unstable, the reference voltage generated by the bandgap voltage generating circuit may be too small. In the meanwhile, the voltage regulating circuit increases the reference voltage referred by the power-on reset circuit for avoiding the incorrect operation of the power-on reset circuit.

In order to make the features and advantages of the present invention comprehensible, preferred embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
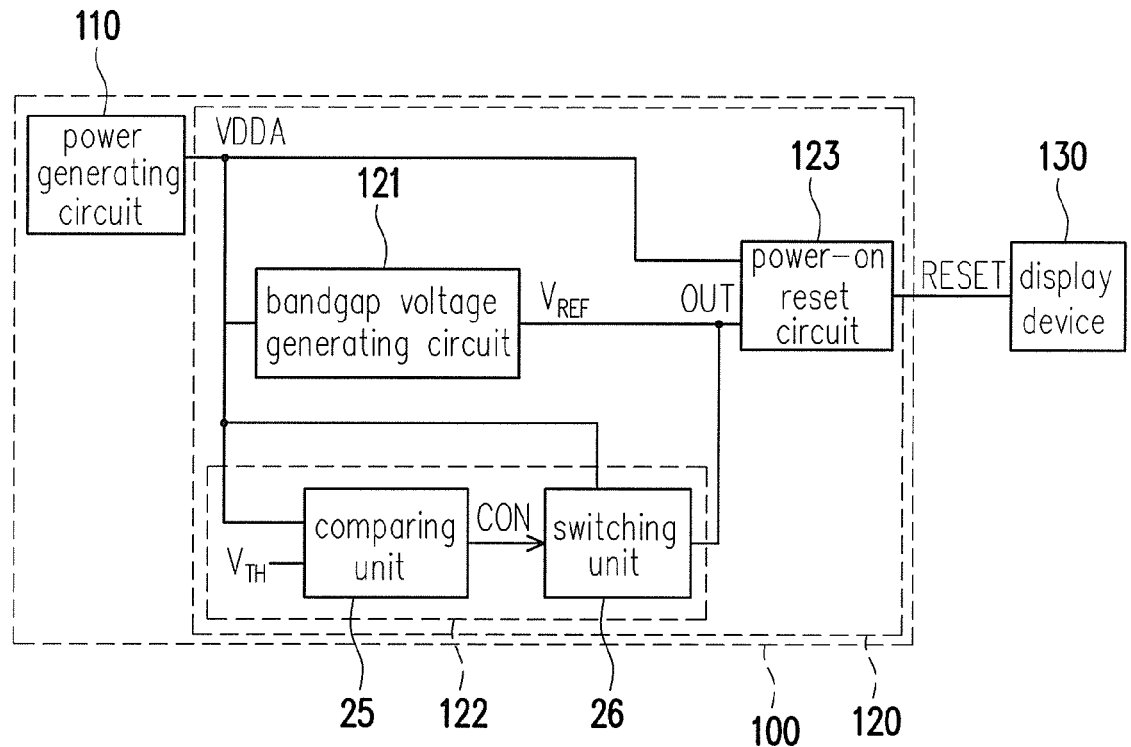
FIG. 1 is a diagram of a power supply device according to an embodiment of the present invention.

FIG. 1 is a diagram of a power supply device according to an embodiment of the present invention. Referring to FIG. 1, the power supply device 100 includes a power generating circuit 110 and a power detecting device 120. The power generating circuit 110 provides a power voltage VDDA to a display device 130 when the power generating circuit 110 is started. The display device 130, for example, is a liquid crystal display or a liquid crystal on silicon display. The power detecting device 120 includes a reference voltage generator, and a power-on reset circuit 123. The reference voltage generator includes a bandgap voltage generating circuit 121 and a voltage regulating circuit 122. The bandgap voltage generating circuit 121 is driven to operate by the power voltage VDDA. The bandgap voltage generating circuit 121 provides a reference voltage $V_{REF}$ to the power-on reset circuit 123 via an output terminal OUT thereof. The power-on reset circuit 123 is coupled to the output terminal OUT of the bandgap voltage generating circuit 121. When the power voltage VDDA reaches the reference voltage $V_{REF}$, the power-on reset circuit 123 generates a reset signal RESET to the display device 130 for resetting the display device 130.

Figure 2:
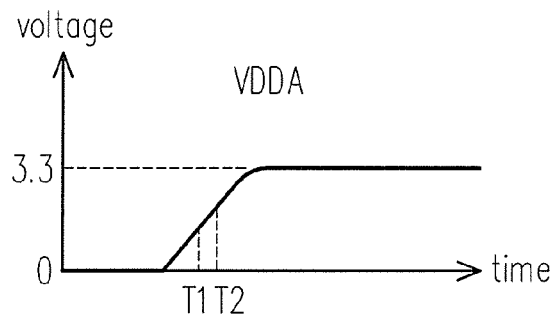
FIG. 2 is curve diagrams of the power voltage and the reference voltage according to an embodiment of the present invention.
Figure 2:
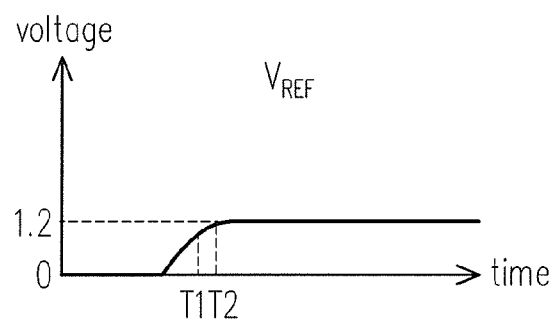

FIG. 2 is curve diagrams of the power voltage and the reference voltage according to an embodiment of the present invention. Referring to FIG. 1 and FIG. 2, it is assumed that the power voltage VDDA provided to the display device 130 is 3.3 volts, and the reference voltage provided by the bandgap voltage generating circuit 121 is 1.2 volts. In the beginning of that the power generating circuit 110 is started, the power voltage VDDA gradually increases from 0 volt to 3.3 volts. Generally, as the time T2 shown, the power-on reset circuit 123 generates the reset signal RESET until the power voltage VDDA on the rise is sufficient to power the internal circuits of the display device 130. At the time T2, the power voltage VDDA is higher than the reference voltage $V_{REF}$, so that the power-on reset circuit 123 generates the reset signal RESET to reset the display device 130.

Nevertheless, the reference voltage $V_{REF}$ generated by the bandgap voltage generating circuit 121 also gradually increases to 1.2 volts as the increase of the power voltage VDDA. Actually, before the time T2, the bandgap voltage generating circuit 121 would generate a smaller reference voltage due to unstable power voltage VDDA. The power voltage VDDA reaches the reference voltage $V_{REF}$ ahead of time, e.g. at the time T1, and the power-on reset circuit 123 is started incorrectly. The incorrect operation of the power-on reset circuit 123 may also occur when the power voltage VDDA is transiently provided to an over load. Hence, the voltage regulating circuit 122 in the embodiment of the present invention increases the reference voltage $V_{REF}$ to be higher than the power voltage VDDA when the power voltage VDDA is unstable for ensuring the reset of the display device 130 is correct.

The voltage regulating circuit 122 coupled to the output terminal of the bandgap voltage generating circuit 121 includes a comparing unit 25 and a switching unit 26. The comparing unit 25 generates a control signal CON according to a comparison result between the power voltage VDDA and the threshold voltage $V_{TH}$. When the power voltage VDDA does not reach the threshold voltage $V_{TH}$, it means that the power voltage VDDA is unstable and may drive the bandgap voltage generating circuit 121 to generate a smaller reference voltage $V_{REF}$. In the meanwhile, the control signal CON generated by the comparing unit 25 controls the switching unit 26 to conduct the power voltage VDDA to the output terminal OUT of the bandgap voltage generating circuit 121 for increasing the reference voltage $V_{REF}$. Therefore, when the power voltage VDDA is unstable, the reference voltage $V_{REF}$ is higher than the power voltage VDDA to avoid starting the power-on reset circuit 123.

Figure 3:
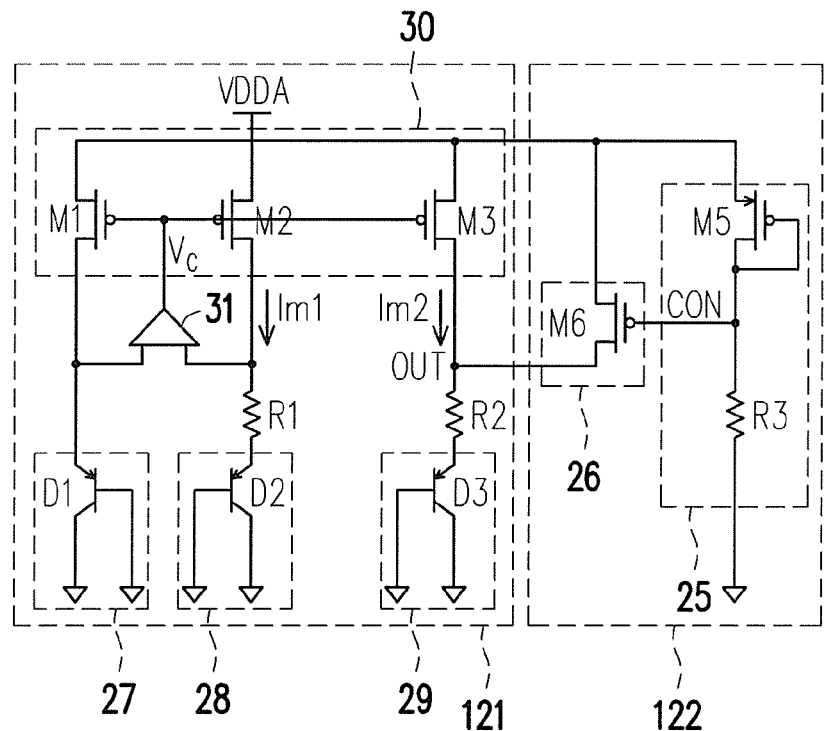
FIG. 3 is a circuit diagram of the reference voltage generator according to the embodiment of the present invention in FIG. 1.

FIG. 3 is a circuit diagram of the reference voltage generator according to the embodiment of the present invention in FIG. 1. Referring to FIG. 3, reference voltage generator in the power detecting device 120 includes the bandgap voltage generating circuit 121 and the voltage regulating circuit 122. People ordinarily skilled in the art should realize any practices of the power-on reset circuit 123 that generates the reset signal RESET by reference to the reference voltage $V_{REF}$ so that it is not to say more than what is needed in the embodiment of the present invention. The bandgap voltage generating circuit 121 includes resistors R1 and R2, diode elements 27 through 29, a current mirror circuit 30 and an operational amplifier 31. In the embodiment of the present invention, the diode elements 27 through 29 are implemented by bipolar junction transistors D1 through D3 respectively, but people ordinarily skilled in the art can utilize metal oxide semiconductor transistors or diodes to implement the diode elements 27 through 29, so that the present invention should not be limited thereto.

The operational amplifier 31 generates a control bias voltage $V_C$ to the current mirror circuit 30 according to a signal of anodes of the diode elements 27 and 28 for making the current mirror circuit 30 operate stably. The current mirror circuit 30 is composed of transistors M1 through M3. The current mirror circuit 30 controlled by the control bias voltage $V_C$ mirrors a current flowing through the diode element 27 to generate mirroring currents Im1 and Im2 respectively flowing through the diode element 28 and 29. The mirroring current Im2 flowing through the diode element D3 can generate the reference voltage $V_{REF}$ to the output terminal OUT of the bandgap voltage generating circuit 121.

The voltage regulating circuit 122 includes the comparing unit 25 and the switching unit 26. The comparing unit 25 includes a resistor R3 and a diode element implemented by a transistor M5, wherein the threshold voltage $V_{TH}$ is a conducted voltage of the diode element, e.g. 0.6 volts. In the embodiment of the present invention, the switching unit 26 is implemented by a transistor M6. When the power voltage VDDA is a low voltage (e.g. VDDA<0.6), the transistor M3 can not provide sufficient current due to the limitation of its intrinsic threshold voltage, and then results in that the reference voltage $V_{REF}$ is too small.

Therefore, in the voltage regulating circuit 122, when the power voltage VDDA does not reach the threshold voltage $V_{TH}$, the diode element implemented by the transistor M5 is not conducted, so that the transistor M5 generates the control voltage CON with low level to a gate of the transistor M6 to conduct the transistor M6. Through the conducted transistor M6, a charge path from the power terminal to the output terminal OUT of the bandgap voltage generating circuit 121 is formed for increasing the reference voltage $V_{REF}$ outputted from the output terminal OUT. When the power voltage VDDA is stable, that is, the power voltage VDDA reaches the threshold voltage $V_{TH}$, the transistor M5 is conducted to generate the control voltage CON with high level to the gate of the transistor M6, so that the transistor M6 is not conducted for inactivating the voltage regulating circuit 122. In the meanwhile, the voltage generating circuit 122 controlled by the stable power voltage VDDA generates the reference voltage $V_{REF}$.

Figure 4:
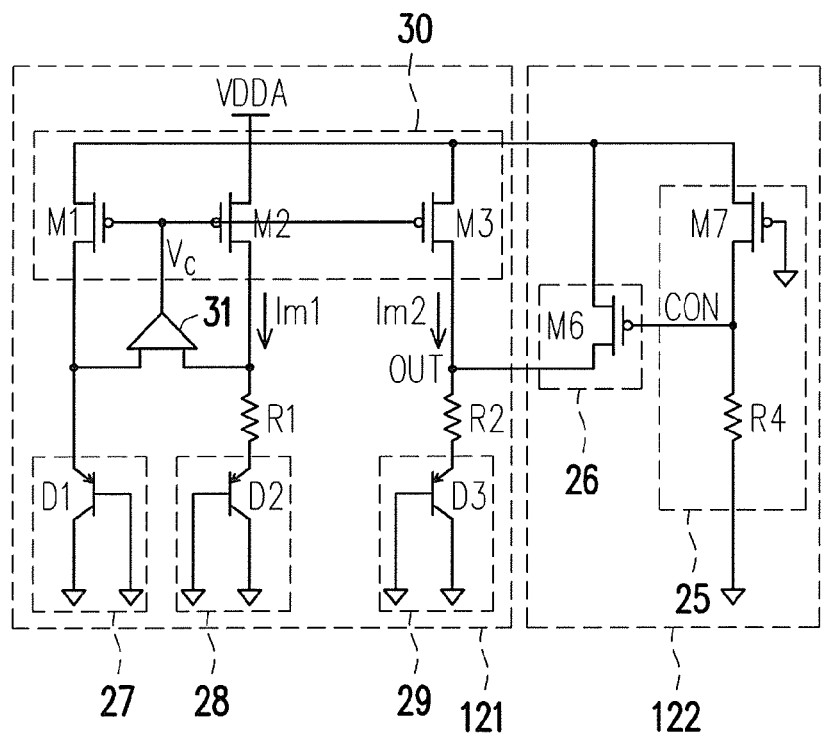
FIG. 4 is a circuit diagram of the reference voltage generator according to the embodiment of the present invention in FIG. 1.

FIG. 4 is a circuit diagram of the reference voltage generator according to the embodiment of the present invention in FIG. 1. Referring to FIG. 3 and FIG. 4, the difference between the embodiments in FIG. 3 and FIG. 4 is that the comparing unit 25 in FIG. 4 includes a resistor R4 and a resistor element implemented by a transistor M7. By designing the resistance of the resistor R5 and a width-to-length ratio of the transistor M7, the threshold voltage $V_{TH}$ can be adjusted. Similar to the operation of the embodiment in FIG. 3, when the power voltage VDDA does not reach the threshold voltage $V_{TH}$, the control voltage CON with high level, which is a divided voltage from the resistor R5 and the transistor M7, conducts the transistor M6 for forming the charge path from the power terminal to the output terminal OUT so as to increase the reference voltage $V_{REF}$ outputted from the output terminal OUT. When the power voltage VDDA reaches the threshold voltage $V_{TH}$, the control voltage CON with low level, which is a divided voltage from the resistor R5 and the transistor M7, makes the transistor M6 not conduct for inactivating the voltage regulating circuit 122.

In summary, the power detecting device 120 in the said embodiment timely increases the reference voltage $V_{REF}$, referred by the power-on reset circuit 123, to be higher than the power voltage VDDA when the power voltage VDDA is unstable, so that the power-on reset circuit 123 would not be started when the power-on reset circuit is unstable. In addition, the occurrence probability of deficient image can be decreased.

It will be apparent to those skilled in the art that various modifications and variations can be made to the structure of the present invention without departing from the scope or spirit of the invention. In view of the foregoing descriptions, it is intended that the present invention covers modifications and variations of this invention if they fall within the scope of the following claims and their equivalents.

What is claimed is:

1. A power detecting device, adapted to detect a power voltage provided to a display device, comprising:
a bandgap voltage generating circuit, driven to operate according the power voltage for providing a reference voltage via an output terminal of the bandgap voltage generating circuit;
a voltage regulating circuit, coupled to the output terminal of the bandgap voltage generating circuit to provide a current path to charge the output terminal of the bandgap voltage generating circuit when the power voltage does not reach a threshold voltage, wherein the voltage regulating circuit comprises:
a comparing unit, generating a control voltage according to a comparison result between the power voltage and the threshold voltage; and
a switching unit, having a first terminal and a second terminal respectively coupled to the power voltage and the output terminal of the bandgap voltage generating circuit and conducting the first terminal of the switching unit to the second terminal of the switching unit according to the control voltage to provide the current path; and
a power-on reset circuit, coupled to the output terminal of the bandgap voltage generating circuit for generating a reset signal to reset the display device when the power voltage reaches the reference voltage.

2. The power detecting device as claimed in claim 1, wherein the comparing unit comprises:
a first diode element, having an anode coupled to the power voltage and a cathode generating the control voltage; and
a first resistor, having a first terminal and a second terminal respectively coupled to the cathode of the first diode element and a ground voltage.

3. The power detecting device as claimed in claim 1, wherein the comparing unit comprises:
a first transistor, having a first source/drain coupled to the power voltage, and both of a gate and a second source/drain coupled together for generating the control voltage; and
a first resistor, having a first terminal and a second terminal respectively coupled to the second source/drain of the first transistor and a ground voltage.

4. The power detecting device as claimed in claim 1, wherein the comparing unit comprises:
a first transistor, having a gate coupled to a bias voltage, a first source/drain coupled to the power voltage, and a second source/drain generating the control voltage; and
a first resistor, having a first terminal and a second terminal respectively coupled to the second source/drain of the first transistor and a ground voltage.

5. The power detecting device as claimed in claim 1, wherein the bandgap voltage generating circuit comprises:
a first diode element, having an anode, and cathode coupled to a ground voltage;
a second diode element, having an anode, and cathode coupled to the ground voltage;
a second diode element, having an anode serving as the output terminal of the bandgap voltage generating circuit for providing the reference voltage, and cathode coupled to the ground voltage;
a current mirror circuit, coupled to the anodes of the first diode element and the second diode element and controlled by a control bias voltage for generating a first mirroring current flowing through the second diode element and a second mirroring current flowing through the third diode element according to a current flowing through the first diode element; and
an operational amplifier, having a first input terminal coupled to the anode of the first diode element, a second input terminal coupled to the anode of the second diode element, and a first output terminal generating the control bias voltage to the current mirror circuit.

6. The power detecting device as claimed in claim 5, wherein the bandgap voltage generating circuit further comprises:
- a first resistor, having a first terminal receiving the first mirroring current, and a second terminal coupled to the anode of the second diode element; and
- a second resistor, having a first terminal serving as the output terminal of the bandgap voltage generating circuit for receiving the second mirroring current and providing the reference voltage, and a second terminal coupled to the anode of the third diode element.

7. The power detecting device as claimed in claim 1, wherein the display device comprises a liquid crystal display or a liquid crystal on silicon display.

8. A power supply device, adapted to a display device, comprising:
- a power generating circuit, providing a power voltage to the display device when operating;
- a bandgap voltage generating circuit, driven to operate according the power voltage for providing a reference voltage via an output terminal of the bandgap voltage generating circuit;
- a voltage regulating circuit, coupled to the output terminal of the bandgap voltage generating circuit to provide a current path to charge the output terminal of the bandgap voltage generating circuit when the power voltage does not reach a threshold voltage, wherein the coltage regulating circuit comprises:
- a comparing unit, generating a control voltage according to a comparison result between the power voltage and the threshold voltage; and
    - a switching unit, having a first terminal and a second terminal respectively coupled to the power voltage and the output terminal of the bandgap voltage generating circuit and conducting the first terminal of the switching unit to the second terminal of the switching unit according to the control voltage to provide the current path; and
- a power-on reset circuit, coupled to the output terminal of the bandgap voltage generating circuit for generating a reset signal to reset the display device when the power voltage reaches the reference voltage.

9. The power supply device as claimed in claim 8, wherein the comparing unit comprises:
- a first diode element, having an anode coupled to the power voltage and a cathode generating the control voltage; and
- a first resistor, having a first terminal and a second terminal respectively coupled to the cathode of the first diode element and a ground voltage.

10. The power supply device as claimed in claim 8, wherein the comparing unit comprises:
- a first transistor, having a first source/drain coupled to the power voltage, and both of a gate and a second source/drain coupled together for generating the control voltage; and
- a first resistor, having a first terminal and a second terminal respectively coupled to the second source/drain of the first transistor and a ground voltage.

11. The power supply device as claimed in claim 8, wherein the comparing unit comprises:
- a first transistor, having a gate coupled to a bias voltage, a first source/drain coupled to the power voltage, and a second source/drain generating the control voltage; and
- a first resistor, having a first terminal and a second terminal respectively coupled to the second source/drain of the first transistor and a ground voltage.

12. A reference voltage generator, comprising:
- a bandgap voltage generating circuit, driven to operate according a power voltage for providing a reference voltage via an output terminal of the bandgap voltage generating circuit; and
- a voltage regulating circuit, coupled to the output terminal of the bandgap voltage generating to provide a current path to charge the output terminal of the bandgap voltage generating circuit when the power voltage does not reach a threshold voltage, power voltage does not reach a threshold voltage, wherein the voltage regulating circuit comprises:
- a comparing unit, generating a control voltage according to a comparison result between the power voltage and the threshold voltage; and
- a switching unit, having a first terminal and a second terminal respectively coupled to the power voltage and the output terminal of the handgap voltage generating circuit, and conducting the first terminal of the switching unit to the second terminal of the switching unit according to the control voltage to provide the current path.

13. The reference voltage generator as claimed in claim 12, wherein the comparing unit comprises:
- a first diode element, having an anode coupled to the power voltage and a cathode generating the control voltage; and
- a first resistor, having a first terminal and a second terminal respectively coupled to the cathode of the first diode element and a ground voltage.

14. The reference voltage generator as claimed in claim 12, wherein the comparing unit comprises:
- a first transistor, having a first source/drain coupled to the power voltage, and both of a gate and a second source/drain coupled together for generating the control voltage; and
- a first resistor, having a first terminal and a second terminal respectively coupled to the second source/drain of the first transistor and a ground voltage.

15. The reference voltage generator as claimed in claim 12, wherein the comparing unit comprises:
- a first transistor, having a gate coupled to a bias voltage, a first source/drain coupled to the power voltage, and a second source/drain generating the control voltage; and
- a first resistor, having a first terminal and a second terminal respectively coupled to the second source/drain of the first transistor and a ground voltage.

16. The reference voltage generator as claimed in claim 12, wherein the bandgap voltage generating circuit comprises:
- a first diode element, having an anode, and cathode coupled to a ground voltage;
- a second diode element, having an anode, and cathode coupled to the ground voltage;
- a second diode element, having an anode serving as the output terminal of the bandgap voltage generating circuit for providing the reference voltage, and cathode coupled to the ground voltage;
- a current mirror circuit, coupled to the anodes of the first diode element and the second diode element and controlled by a control bias voltage for generating a first mirroring current flowing through the second diode element and a second mirroring current flowing through the third diode element according to a current flowing through the first diode element; and
- an operational amplifier, having a first input terminal coupled to the anode of the first diode element, a second input terminal coupled to the anode of the second diode element, and a first output terminal generating the control bias voltage to the current mirror circuit.

17. The reference voltage generator as claimed in claim 16, wherein the bandgap voltage generating circuit further comprises:
a first resistor, having a first terminal receiving the first mirroring current, and a second terminal coupled to the anode of the second diode element; and
a second resistor, having a first terminal serving as the output terminal of the bandgap voltage generating circuit for receiving the second mirroring current and providing the reference voltage, and a second terminal coupled to the anode of the third diode element.

* * * * *